US006217915B1

(12) United States Patent
Luchansky et al.

(10) Patent No.: US 6,217,915 B1
(45) Date of Patent: Apr. 17, 2001

(54) FEED ADDITIVE THAT INCREASES AVAILABILITY OF BUTYRIC ACID AND NON-DIGESTIBLE OLIGOSACCHARIDES IN THE G.I. TRACT

(75) Inventors: John B. Luchansky, Madison, WI (US); Andrea Piva, Bologna (IT)

(73) Assignee: Wisconsin Alumni Research Foundation, Madison, MI (US)

( * ) Notice: Subject to any disclaimer, the term of this patent is extended or adjusted under 35 U.S.C. 154(b) by 0 days.

(21) Appl. No.: 09/368,269

(22) Filed: Aug. 3, 1999

Related U.S. Application Data

(60) Provisional application No. 60/104,239, filed on Oct. 14, 1998.

(51) Int. Cl.[7] .............................. A23K 1/18; A23L 1/236

(52) U.S. Cl. ................................ 426/2; 426/636; 426/807

(58) Field of Search ................................ 426/2, 807, 636

(56) References Cited

U.S. PATENT DOCUMENTS

| | | | | |
|---|---|---|---|---|
| 3,952,107 | * | 4/1976 | Shibata | 424/311 |
| 4,996,067 | | 2/1991 | Kobayashi et al. | 426/96 |
| 5,589,187 | | 12/1996 | Wentworth et al. | 424/439 |

FOREIGN PATENT DOCUMENTS

| | | |
|---|---|---|
| 0 218 324 A1 | 4/1987 | (EP) . |
| 0 464 362 A1 | 1/1992 | (EP) . |
| 0 661 004 A1 | 7/1995 | (EP) . |

OTHER PUBLICATIONS

Bird et al., Energy Values of Lactitol and Lactulose as Determined with Miniature Pigs and Growing Rats, *J. Sci. Food Agric* (1990), 51:233–246.

Crittenden et al., Production, Properties and applications of food–grade oligosaccharides, *Trends in Food Science & Technology* (Nov. 1996), 7:353–362.

Perry, Frederick George, Biotechnology in animal feeds and animal feeding: an overview, *Biotechnology in Animal Feeds and Animal Feeding*, Ed. by R. John Wallace and Andrew Chesson, Weinheim, NY (1995) pp. 1–15.

Piva et al., Lactitol Enhances Short–Chain Fatty Acid and Gas Production by Swine Cecal Microflora to a Greater Extent When Fermenting Low Rather Than High Fiber Diets, *J. Nutr.* (1996) 126:280–289.

Piva et al., Effect of microencapsulation on absorption processes in the pig, *Livestock Production Science*, (1997), p. 1521.

Piva et al., Role of lactitol in in vitro low or high fiber cecal fermentations, J. Ari Sci, vol. 73, No. Suppl. 1, p. 180, 1995.

Rajala et al., treatment of chronic constipation with lactitol sweetened yoghurt supplemented with guar gum and wheat bran in elderly hospital in–patients, Compr Geontal A (1988), 2:83–86.

Salminen et al., Substrates and Lactic Acid Bacteria, *Lactic Acid Bacteria*, Ed. Seppo Salminen (1993), pp. 295–306.

Tomomatsu, Hideo, Health Effects of Oligosaccharides, *Food Technology* (Oct. 1994), pp. 61–65.

* cited by examiner

*Primary Examiner*—Chhaya D. Sayala
(74) *Attorney, Agent, or Firm*—Joseph T. Leone, Esq.; DeWitt Ross & Stevens S.C.

(57) ABSTRACT

Disclosed is a feed additive which increases the availability of butyric acid and a pre-biotic to the intestinal mucosa and to beneficial microflora in the gut, respectively. The feed composition contains tributyrin and lactitol, a non-digestible oligosaccharide.

13 Claims, No Drawings

FEED ADDITIVE THAT INCREASES AVAILABILITY OF BUTYRIC ACID AND NON-DIGESTIBLE OLIGOSACCHARIDES IN THE G.I. TRACT

Priority is claimed to provisional patent application Ser. No. 60/104,239, filed Oct. 14, 1998.

FIELD OF THE INVENTION

The invention is directed toward feed and feed additives for ruminant and monogastric animals, including humans, which increase the amount of butyric acid and non-digestible oligosaccharides in the intestine.

DESCRIPTION OF THE PRIOR ART n-Butyric acid (n-butanoic acid) is known as a source of energy for the intestinal mucosa of animals. In general, increasing the concentration of butyric acid within the lumen of the intestine results in increased mucosal growth and an increase in the aspect ratio of the mucosal villi and the depth of the cripts. This, in turn, increases the surface area of the mucosa and hence the ability of the mucosa to absorb nutrients from within the contents of the intestine.

Tributyrin, also known as glyceryl tributyrate or tributyl glycerol, has the following formula:

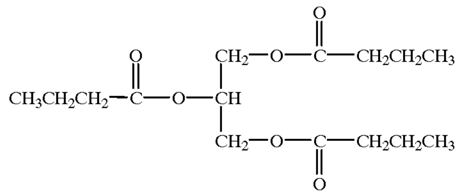

Tributyrin can be prepared synthetically by the esterfication of glycerol in the presence of excess butyric acid. Tributyrin is readily available in bulk quantities from several national and international suppliers, such as Aldrich, Milwaukee, Wis. Acid and/or enzymatic hydrolysis of tributyrin yields three molar equivalents of butyric acid.

Lactitol, the common name for the oligosaccharide 4-β-D-galactosyl-D-sorbitol, has the following formula:

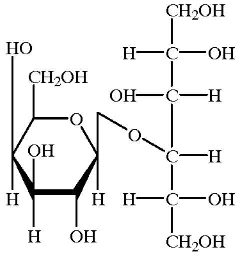

Lactitol is prepared synthetically by the hydration of lactose. Lactitol is readily available in bulk quantities from numerous national and international suppliers, such as Purac, Arlington Heights, Ill. In one application it is used as a non-caloric sweetener in foods such as ice cream. Host 62-galactosidases found in the small intestines of mammals degrade lactitol to only an extremely limited extent. As a consequence, lactitol is not absorbed to any appreciable extent by the mammalian gut. However, lactitol is utilized as an energy source by the microflora residing within the intestinal lumen of mammals. Other oligosaccharides containing a galactosyl unit which is β-linked to another sugar moiety (such as lactulose) behave similarly.

Several prior art references describe the addition of lactitol to animal feeds. For instance, EPA 0 218 324 A1 describes a growth-stimulating animal feed containing lactitol. This reference specifically states, at page 3, lines 12–14, that "the addition of lactitol to the feed of a monogastric domestic animal improves the growth of the animal." See also EPA 0 464 362 A1 for a similar discussion by the same inventors.

Piva et al. (1996) "Lactitol Enhances Short-Chain Fatty Acid and Gas Production by Swine Cecal Microflora to a Greater Extent When Fermenting Low Rather Than High Fiber Diets," J. Nutr. 126:280–289, report the addition of lactitol to swine feed in an effort to enhance cecal fermentation. The results presented in this paper indicate that lactitol is more beneficial as a feed additive when used in combination with a low-fiber diet as compared to a high-fiber diet.

European Patent Application 0 661 004 A1 describes an animal feed composition containing lactitol and amino acids. The specification states that any sugar alcohol, including lactitol, can be used in the composition, so long as the sugar alcohol does not undergo aminocarbonylation with the amino group of amino acids. The composition is puported to improve the "nutritional condition" of an animal.

See also W. C. Sauer (1997) "The Mode and Action of Oligosaccharides in the Digestive Tract of Early-Weaned Pigs," Alberta Agricultural Research Institute, Project No. 93-0305. This reference describes a line of research investigating the mode of action of oligosaccharides in the digestion of early-weaned pigs. The pigs' diet was supplemented with various oligosaccharides, including lactitol. This reference states that "supplementation with . . . lactitol had little effect on the apparent ileal digestibilities of amino acids and monosaccharides." Sauer, therefore, concludes that "the supplementation of diets for weanling pigs . . . with oligosaccharides or lactitol at these levels does not affect nutrient digestibilities and bacterial populations in the small intestine."

Of particular note regarding these prior art references is that the beneficial nature of lactitol as a feed additive for monogastric or ruminant animals, and swine in particular, has not been unambiguously established, nor has its activity been established in combination with butyrate or derivatives thereof, including tributyrin.

DEFINITIONS

The following terms are expressly defined herein:

Non-digestible oligosaccharide (NDO): A subset of prebiotic compounds which are non-digestible by a host animal and which are comprised of two or more sugar moieties. Expressly, but not exclusively, included within the term NDO are galacto-oligosaccharides of all types, including lactitol, lactulose, lactosucrose, fructo-oligosaccharides, palatinose-oligosaccharides, glycosyl sucrose, malto-oligosaccharides, isomalto-oligosaccharides, cyclodextrins, gentio-oligosaccharides, soy-oligosaccharides, and xylo-oligosaccharides.

Pre-biotic: A non-digestible food ingredient that beneficially affects a host animal by preferentially stimulating the growth and/or activity of one or a limited number of bacteria in the colon, and thus improves health, growth, vigor, etc. of the host animal. Pre-biotics are neither wholly hydrolyzed nor completely absorbed in the upper part of the gastro-intestinal tract.

SUMMARY OF THE INVENTION

The invention is directed to a synergistic animal feed composition comprising, in combination, tributyrin and a pre-biotic compound, preferably a non-digestible oligosaccharide (NDO). The pre-biotic compound is essentially non-digestible by the host animal but is fermentable by intestinal microflora present in the colon of the host animal. In the most preferred embodiment, the NDO is lactitol. Other preferred pre-biotic compounds include fructo-oligosaccharides and galacto-oligosaccharides other than lactitol and/or other pre-biotics.

The combination of tributyrin and a pre-biotic such as lactitol is synergistic in that the two ingredients are believed to generate butyric acid in the intestine of an animal host, while simultaneously encouraging the growth of beneficial bacteria in the lower intestine, thereby synergistically increasing the rate of weight gain and/or feed utilization of the animals. While not being bound to any particular mechanism, it is believed that tributyrin is degraded, presumably by acid hydrolysis and/or lipase activity, in the stomach and upper small intestine to yield butyric acid. The released butyric acid is then utilized as an energy source by the mucosal cells lining the intestine, resulting in improved mucosal trophism.

Pre-biotic compounds, such as NDO's, pass through the stomach and small intestine essentially unchanged and ultimately enter the large intestine, where such compounds are preferentially fermented by select microflora which inhabit the gut of animals.

The pre-biotic compounds are preferentially utilized by the lactic acid group of bacteria, including lactobacilli and bifidobacteria, which are capable of flourishing in the animal gut under the proper conditions. These beneficial bacteria produce mainly lactic acid as a fermentation end product which lowers the pH of the lower gut. This lower pH is inhospitable to many undesirable microorganims (including human and animal pathogens) which cannot survive in the lowered pH conditions. Consequently, the invention encourages a more favorable microbial balance in the GI tract. The benefical bacteria thrive due to the presence of a ready energy source such as a NDO, produce lactic acid which lowers the pH of the gut (which is also antimicrobial), and thereby competitively exclude colonization by other, potentially detrimental organisms.

These beneficial bacteria may also produce antimicrobial compounds, including bacteriocins, hydrogen peroxide, etc., which also inhibit the growth of undesirable and/or pathogenic organisms.

Another advantage of the invention is that by encouraging the vigorous growth of beneficial bacteria, this may prevent conversion of pre-oncogenic compounds into oncogenic compounds by enzymatic hydrolysis.

Some of the beneficial organisms found in the animal gut also produce butyric acid as an end product of fermentation. As noted above, the butyric acid is then utilized by the colonocytes which line the lower intestine.

Another advantage of the composition is the intrinsic sweetness of many NDO's (lactitol in particular) coupled with the taste of tributyrin, which is far less pungent than butyric acid itself. The composition is, therefore, very desirable to most animals. In particular, swine are very particular about bitter or "off" tasting feed. Swine are, however, very fond of anything sweet. Consequently, the subject composition is willingly ingested by swine. Additionally, if NDO's are used as the pre-biotic, because of their indigestibility, they add little, if any, caloric content to the diet. This may be advantageous in certain circumstances, such as in low-calorie foods for human consumption.

The subject composition is particularly useful when used as a feed additive for humans, swine, cattle, poultry, dogs, cats, sheep, goats, and horses.

DETAILED DESCRIPTION OF THE INVENTION

As noted above, the invention is a feed or feed additive composition comprising tributyrin and a pre-biotic, preferably a NDO. The preferred oligosaccharide is lactitol. When ingested, the composition functions to increase the rate of weight gain in animals by: (1) generating butyric acid by the hydrolysis of tributyrin which is then utilized as an energy source by the intestinal mucosa; and (2) encouraging the growth of beneficial microflora (notably lactobacilli and bifidobacteria) within the lower intestine. This results in a synergistically increased weight gain in animals fed the subject composition as compared to control animals fed either tributyrin or a pre-biotic.

The feed is produced by admixing tributyrin and the pre-biotic to a base feed ration suitable for the animal being fed. Mixing can be done by hand or by using any number of suitable mixing devices, such as an auger-type mixer. For large quantities of feed, large drum mixers or extruders can be used to thoroughly admix the tributyrin and the pre-biotic with the other feed ingredients. If the base feed is not already particulate in nature, the tributyrin and pre-biotic may be added at the same time the base feed is pulverized and/or granulated. Any number of conventional granulating methods can be used to comminute and intimately associate the base ration with the tributyrin and the pre-biotic. These methods include extrusion granulation, fluidized granulation, rolling granulation, or agitation granulation. (See, for instance, Kobayashi et al., U.S. Pat. No. 4,996,067, incorporated herein by reference for its teaching of conventional granulation methods.) Conventional binders, fillers, and excipients, so long as physiologically acceptable, may be added to facilitate granulation. The method of granulation is not critical to the present invention. Once granulated, the composition may be extruded into pellets, if desired.

Suitable base rations and pre-mixes for livestock, poultry, fish, etc. are exceedingly well known in the art and need not be elaborated upon in great detail.

A typical base ration for poultry is as follows:

Typical Base Diet Formulation for Poultry

| Base Diet | kg/100 kg |
|---|---|
| Corn | 48.75 |
| Soybean Meal | 41.23 |
| $CaCO_3$ | 1.40 |
| Corn Oil | 6.89 |
| Methionine | 0.23 |
| Salt | 0.50 |
| Premix | 1.00 |
| Premix: | g/100 kg |
| Vitamin A (10,000 IU/g) | 4,500 |
| Vitamin $D_3$ (8900 IU/g) | 666.7 |
| Vitamin E | 900.0 |
| Riboflavin (100 g/lb) | 243.3 |
| Vitamin $B_{12}$ (300 mg/lb) | 120.0 |
| $ZnSO_4$ (36%) | 666.7 |
| MnO | 633.3 |
| Niacin (50%) | 733.3 |
| Pantothenic acid (25%) | 933.3 |
| Choline (60%) | 9,567 |
| Bring to 100 kg with ground corn. | |

The base poultry diet can also be supplemented with inorganic phosphorous (e.g., monocalcium phosphate) and grit to aid mechanical breakdown of food particles within the gizzard. As used herein, the term "poultry" includes, without limitation, chickens of all types (bantam weights, game hens, egg-producers, broilers, etc.), turkeys, ducks, geese, pheasant and ratites (e.g., ostrich, emu, rhea). Other regularly encountered species falling within the term "poultry" include grouse, woodcock, pigeons, and other avian species either desired as livestock or sporting birds. In short, as used herein, the term "poultry" is synonymous with "avian."

An exemplary base ration for swine is given in the Example below.

For both the pre-biotic and tributyrin, it is preferred that they each comprise from about 0.03% to about 3% by weight, and more preferably from about 0.3% to about 1.0% by weight of the total diet. That is, it is most preferred that from about 0.3 to about 10 grams per kg total feed is the pre-biotic and that from about 0.3 to about 10 grams per kg total feed is tributyrin.

Silage has been regularly used to feed ruminant livestock and is now starting to find increased use in the feeding of monogastric livestock. "Silage" as used herein is defined to mean vegetable matter, often fodder, which has been converted into a feed for livestock through various processes of anaerobic acid fermentation within a silo. A wide variety of vegetable matter, such as corn, beans, peas, alfalfa, and the like, can be converted within silos into silage. As used herein, the term "silo" encompasses any and all types of structures used to produce silage (e.g., vertical silos, trench silos, silage bags, "harvestores," and the like). The invention encompasses admixing tributyrin and a NDO with silage to ultimately arrive at a feed or feed additive for monogastric or ruminant livestock.

In general, however, silage by itself does not constitute a nutritionally complete base feed ration for most monogastric species. Many amino acids and vitamins (most notably, Vitamins B and E) found within raw vegetable matter are degraded during the ensilation process. Ruminant animals can survive when fed only silage owing to rumen microorganisms which synthesize the needed nutrients de novo. Monogastric species, however, are unable to biosynthesize the nutrients destroyed during ensilation and, therefore, suffer from defects owing to malnutrition when fed unsupplemented silage. Therefore, to serve as a nutritionally complete base ration for monogastrics, silage must be supplemented with essential vitamins and other nutrient additives.

However, if the pre-biotic, especially a NDO, is to be admixed with a base ration containing a significant amount of silage, or if the lactitol is to be added directly to silage or materials to be ensiled, or if the ultimate feed product is to be fed to ruminants, the lactitol must be microencapsulated to protect it from fermentation by the organisms contained in the silage and the rumen of the host. Several methods of microencapsulation to protect biologically active compounds are known in the art. See, for example, U.S. Pat. No. 5,589,187 to Wentworth and Wentworth. See also Piva et al. (1997), "Effect of microencapsulation on absorption processes in the pig," *Livestock Production Science,* p. 1521. Both of these documents are incorporated herein by reference.

A preferred method of encapsulation is to encase the pre-biotic and the tributyrin in lipid vesicles (e.g., liposomes, multi-lamellar vesicles, etc.) comprised of long-chain fatty acids. Suitable lipid compositions for use in encapsulation include mixtures of stearic, palmitic, myristic, linoleic (including conjugated linoleic), and oleic acids. The pre-biotic and the tributyrin are admixed with a liquified portion of the long-chain fatty acids in a suitable ratio to adequately disperse the active ingredients. The mixture can then be spray-dried and/or spray-chilled to yield capsules of the long-chain fatty acid which contain pre-biotic and tributyrin.

It is preferred that the tributyrin and pre-biotic be encapsulated together and then added to the materials to be ensiled at the time they are placed into the silo. Alternatively, the encapsulated tributyrin and pre-biotic may be admixed with the silage when it is removed from the silo.

Once the composition is complete, it is fed to animals, either monogastric or ruminant, ad libitum or in any suitable or desired metered fashion, as is well known in feed lot management and animal husbandry.

EXAMPLE

The following Example is included solely to aid in a more complete understanding of the invention. The following Example does not limit the invention described or claimed herein in any fashion.

Example of a Feeding Trial:

Animals: Swine from about 6 to 15 kg of live weight (l.w.)
Genotype: (Large White×Landrace)×Duroc
Number of animals: 64
Experimental treatments:
1 - control diet (given below)
2 - control diet+1% tributyrin
3 - control diet+0.3% non-digestible oligosaccharide (lactitol)
4 - control diet+1% tributyrin+0.3% non-digestible oligosaccharide (lactitol)
Number of animals/treatment: 16
Number of replicates(box)/treatment: 4

Feed consumption and animal weight gain were measured on a regular basis to evaluate feed efficiency and growth rate. The hypothesis was that animals fed diet number 4, that is, the control diet plus 1% tributyrin and 0.3% non-digestible oligosaccharide, will display an increased average growth rate and greater feed efficiency. The animals fed diet number 4 will also have an improved intestinal morphology as compared to the control animals.

| DIET (as fed) kg/100 kg | Control | Tributyrin 1% | Lactitol 0.3% | Tributyrin 1% + Lactitol 0.3% |
|---|---|---|---|---|
| Corn | 37.33 | 37.33 | 37.33 | 37.33 |
| Wheat | 13.00 | 13.00 | 13.00 | 13.00 |
| Barley Flakes | 20.00 | 20.00 | 20.00 | 20.00 |
| Soy Bean Meal | 16.50 | 16.50 | 16.50 | 16.50 |
| Meat Meal | 2.00 | 2.00 | 2.00 | 2.00 |
| Fish Meal | 3.00 | 3.00 | 3.00 | 3.00 |
| Fat | 2.00 | 2.00 | 2.00 | 2.00 |
| Whey Powder | 3.00 | 3.00 | 3.00 | 3.00 |
| L-lysine HCl | 0.29 | 0.29 | 0.29 | 0.29 |
| DL-methionine | 0.08 | 0.08 | 0.08 | 0.08 |
| L-tryptophan | 0.05 | 0.05 | 0.05 | 0.05 |
| L-treonine | 0.03 | 0.03 | 0.03 | 0.03 |
| $CaCO_3$ | 0.70 | 0.70 | 0.70 | 0.70 |
| $CaHPO_4\ 2H_2O$ | 1.40 | 1.40 | 1.40 | 1.40 |
| NaCl | 0.22 | 0.22 | 0.22 | 0.22 |
| Premix | 0.40 | 0.40 | 0.40 | 0.40 |
| Tributyrin | | 1.00 | | 1.00 |
| Lactitol | | | 0.30 | 0.30 |
| DM = Dry Matter | 89.04 | 89.04 | 89.04 | 89.04 |
| CP = Crude Protein | 19.04 | 19.04 | 19.04 | 19.04 |

-continued

| DIET (as fed) kg/100 kg | Control | Tributyrin 1% | Lactitol 0.3% | Tributyrin 1% + Lactitol 0.3% |
|---|---|---|---|---|
| EE = Ether Extract | 4.2 | 4.2 | 4.2 | 4.2 |
| CF = Crude Fiber | 2.64 | 2.64 | 2.64 | 2.64 |
| Ash | 5.9 | 5.9 | 5.9 | 5.9 |
| Starch | 45.55 | 45.55 | 45.55 | 45.55 |
| Lysine | 1.2 | 1.2 | 1.2 | 1.2 |
| Methionine + Cystine | 0.72 | 0.72 | 0.72 | 0.72 |
| Threonine | 0.72 | 0.72 | 0.72 | 0.72 |
| Tryptophan | 0.24 | 0.24 | 0.24 | 0.24 |
| Calcium | 1.07 | 1.07 | 1.07 | 1.07 |
| Phosphorous (total) | 0.75 | 0.75 | 0.75 | 0.75 |
| Sodium | 0.18 | 0.18 | 0.18 | 0.18 |
| Digestible Energy Expressed kcal per kg | 3549 | 3549 | 3549 | 3549 |
| Net Energy Expressed kcal per kg | 2468 | 2468 | 2468 | 2468 |

This Example monitored the effect of diet on 64 weaned piglets {(Large White×Landrace)×Duroc} for 42 days. The experiment was initiated when the piglets were 28 days old (ca. 5.9±1.22 kg). At 21 days after their birth, the piglets were transported from the piggery to the production barn. Before the trial was initiated, the piglets were kept in flat-deck cages for 7 days to monitor their health status. During this adaptation time, the animals were fed a commercially-available, medicated diet (containing clorotetracycline (1,000 mg per Kg diet) and spiramycin (400 mg per Kg diet)) as a prophylactic to minimize the negative consequences of stress due to travel from the piggery to the production barn. The piglets always had free access to water and feed.

At 28 days after birth, the piglets were allotted homogeneously into the following 4 experimental groups according to their initial weight and gender (females and castrated males) and provided with a pelletized feed: 1) control diet (CTR); 2) control diet with 1% tributyrin (TRB); 3) control diet with 0 3% lactitol (LCT); 4) control diet with 1% tributyrin and 0.3% lactitol (TRB+LCT) (see Tables 1 and 2). On days 0, 14, and 42 after the feeding trial was initiated the animals were weighed, and animal health, feed consumption, and feed conversion index were determined. After 42 days, the heaviest 2 castrated males and 2 females from each dietary treatment were sacrificed to measure the empty and full weights of their stomach, cecum, and colon, as well as the weights of their liver and kidneys.

Tributyrin=$C_{15}H_{26}O_6$, MW 302.37, Chemical Abstract number 60-01-5, butanoic acid 1,2,3-propanetriyl ester, density 1.032, color white, odorless, manufactured by Fluka.

Lactitol monohydrate=$C_{12}H_{24}O_{11}$, MW 344.32, Chemical Abstract number 8 1025-04-9, 4-O-B-D-galactopyranosyl-D-glucitol, melting point 120° C., color white, odorless, crystals, manufactured by Xyrofin Oy-Kotka.

Results:

Animals health status. No untoward clinical conditions were observed during the 7-day adaptation period. As such, no medical interventions or treatments were performed. During the 42 days of the feeding trial, it was observed that most animals in each treatment group intermittently experienced some form of mild diarrhea, presumably as a consequence of the relatively short 7-day adaptation period the animals had to adjust to the production barn and to solid feeding. Necropsy of the 5 piglets that died during the feeding trial indicated the occurrence of pneumonia and/or enteritis. The veterinarian attributed death to the stress the animals were exposed to during weaning and transport, as well as the stress experienced during grouping and weighing. A 7-day adaptation period was implemented to assess the possible efficacy of the dietary treatments for stressed animals. This situation is very common in the field and it is often associated with increased weight loss and mortality. The comparative morbidity and mortality among animals in the different dietary treatment groups are listed in Table 3. It should be noted that weight loss was calculated as the difference between the final and initial weight for either days 0 through 14 of the trial or for days 0 through 42 of the trial.

Animal performance. As listed in Table 3, fewer piglets fed tributyrin and lactitol died than piglets fed a diet containing either of these additives used alone. Likewise, fewer piglets fed a diet containing either tributyrin or lactitol died than piglets in the control diet that were not fed either of these additives. A similar trend was observed when weight loss was measured. In general, fewer animals lost weight when fed tributyrin and lactitol, followed by animals fed lactitol alone, followed by animals fed tributyrin alone, followed by animals fed the control diet. Moreover, within the first 14 days of the trial, animals fed tributyrin and lactitol displayed a higher live weight (+15%, $P<0.05$), higher daily weight gain (±85%, $P<0.05$), and higher feed efficiency (5.18 vs 1.62 Kg feed per Kg weight gain) than animals fed the control diet. Similar results were obtained over the entire 42 day trial: animals fed tributyrin and lactitol displayed a final weight (+5.7%), daily weight gain (+10%), and feed efficiency (±9%) appreciably higher than animals fed the control diet (Table 4a).

Animals receiving the control diet were particularly affected by the stress conditions employed in this study. Records from the same production barn for a 5-year period for otherwise similar feeding trials using piglets of the same genotype revealed that piglets displayed an average daily weight gain of 400 and 500 grams per day for days 0–14 and 0–42, respectively, and a feed conversion ratio of 1.3 and 1.6 for days 0–14 and 0–42, respectively (data not shown). In the present study, only animals receiving both tributyrin and lactitol approached these performance levels. It should also be noted that in contrast to previous reports by other investigators, animals fed tributyrin in general did not perform as well as animals fed the control diet over the 42-day feeding trial (Table 4a). Lastly, the organ weights were within the expected/normal ranges, and no alterations were observed among the internal organs of the heaviest male or female animals sacrificed for each treatment group (Table 4b). However, comparisons of the average live weights and attendant standard deviations of the 16 animals in the control group after 42 days revealed that the live weights of these animals were less homogeneous than animals in the other treatment groups (Table 4a). These data intimate that animals within the control group reacted less well to stress. Due to the higher standard deviations in live weights displayed by animals in the control group, sacrificing the heaviest animals from the control group may explain, in part, why such animals displayed higher live weights than animals in the other treatment groups. In contrast, when the live weights of all animals in each treatment group were considered after 42 days, the live weights of animals fed tributyrin and lactitol or animals fed lactitol alone were higher than the live weights of the control animals.

The piglets used in this study were exposed to stress associated with: i) transport from the piggery to the production barn; ii) weaning; iii) adaptation to solid feeding; and iv) grouping and weighing. For these stressed piglets, the combined feeding of tributyrin (1%) and lactitol (0.3%) was more beneficial than feeding either tributyrin (1%) or lactitol (0.3%) alone or feeding the control diet for reducing mortality and weight loss and for improving weight gain and feed efficiency. These results show the utility of the present invention as an animal feed composition.

TABLE 1

Diet composition (%).

| | CTR | TRB | | LCT | TRB + LCT |
|---|---|---|---|---|---|
| Corn | | | 37.33 | | |
| Wheat | | | 13.00 | | |
| Barley | | | 20.00 | | |
| Soybean meal 48% | | | 16.50 | | |
| Meat meal | | | 2.00 | | |
| Fish meal | | | 3.00 | | |
| Tallow | | | 2.00 | | |
| Dried whey | | | 3.00 | | |
| L-lysine HCl | | | 0.29 | | |
| DL-methionine | | | 0.08 | | |
| L-tryptophan | | | 0.05 | | |
| L-treonine | | | 0.03 | | |
| Calcium carbonate | | | 0.70 | | |
| Dicalcium phosphate | | | 1.40 | | |
| Sodium chloride | | | 0.22 | | |
| Premix | | | 0.40 | | |
| Tributyrin | — | 1.00 | | — | 1.00 |
| Lactitol | — | — | | 0.30 | 0.30 |

TABLE 2

Proximate analysis of diets (g/Kg of dry matter).

| | | CTR | TRB | LCT | TRB + LCT |
|---|---|---|---|---|---|
| Dry Matter | g/kg diet | 892.0 | 890.8 | 893.7 | 890.6 |
| Crude protein | g/kg DM | 199.3 | 204.2 | 201.6 | 200.4 |
| Ether extract | g/kg DM | 53.6 | 63.4 | 54.7 | 62.0 |
| Crude fiber | g/kg DM | 38.8 | 38.5 | 42.1 | 39.1 |
| Ash | g/kg DM | 62.3 | 60.8 | 62.9 | 60.6 |
| Starch | g/kg DM | 487.4 | 469.8 | 474.3 | 474.1 |
| Digestible energy[1] | MJ/kg | 16.09 | 16.11 | 16.08 | 16.10 |
| Net energy[2] | MJ/kg | 12.00 | 12.02 | 12.00 | 12.02 |

[1]According to Whittemore (1980)
[2]According to Noblet et al. (1994)

TABLE 3

Incidence of mortality and weight loss during the experimental period.

| | CTR | TRB | LCT | TRB + LCT |
|---|---|---|---|---|
| | Number of piglets | | | |
| Beginning of the study | 16 | 16 | 16 | 16 |
| 0–14 d | | | | |
| Mortality | 1 | 1 | 0 | 0 |
| Weight loss | 5 | 4 | 2 | 1 |
| 0–42 d | | | | |
| Mortality | 3 | 1 | 1 | 0 |
| Weight loss | 1 | 3 | 0 | 0 |
| Mortality incidence % | 18.75 | 6.25 | 6.25 | 0 |

TABLE 4a

Piglet growth performance and feed efficiency.

| | | CTR | TRB | LCT | TRB + LCT |
|---|---|---|---|---|---|
| Number of piglets | | 16 | 16 | 16 | 16 |
| Initial live weight | kg | 5.9 | 5.9 | 6.0 | 5.9 |
| 14 d | | | | | |
| Live weight | kg | 7.3 | 7.1 | 7.9 | 8.4 |
| Weight gain | kg | 1.32 | 1.12 | 1.87 | 2.44 |
| Average Daily Gain | g/d | 94 | 80 | 133 | 174 |
| Feed intake | g | 250 | 240 | 265 | 279 |
| Feed Conversion Ratio | | 5.18 | 3.95 | 2.08 | 1.62 |
| 42 d | | | | | |
| Live Weight | kg | 13.9 ± 5.5 | 11.1 ± 4.9 | 14.5 ± 3.5 | 14.7 ± 3.9 |
| Weight gain | kg | 7.89 | 5.10 | 8.48 | 8.70 |
| Average Daily Gain | g/d | 188 | 121 | 202 | 207 |
| Feed intake | g | 365 | 299 | 370 | 362 |
| Feed Conversion Ratio | | 1.94 | 2.53 | 1.87 | 1.77 |
| Total weight of weaned piglets (kg) | | 180.7 | 166.5 | 217.5 | 235.2 |
| Deviation from CTR | | — | −7.86% | +20.36% | +30.16% |

TABLE 4b

Piglet growth performance and feed efficiency after slaughter.

| | | CTR | TRB | LCT | TRB + LCT |
|---|---|---|---|---|---|
| Number of piglets | | 4 | 4 | 4 | 4 |
| Live weight | kg | 19.15 | 16.75 | 17.08 | 18.43 |
| Metabolic Weight (MW = live weight$^{0.75}$ kg) | | 9.12 | 8.24 | 8.37 | 8.89 |
| Liver | % MW | 7.07 | 5.57 | 6.45 | 6.66 |
| Right kidney | % MW | 0.52 | 0.46 | 0.54 | 0.46 |
| Left kidney | % MW | 0.51 | 0.48 | 0.53 | 0.47 |
| Full stomach | % MW | 13.58 | 8.55 | 15.58 | 13.39 |
| Empty stomach | % MW | 2.70 | 2.66 | 2.82 | 2.73 |
| Full cecum | % MW | 1.61 | 1.37 | 1.35 | 1.66 |
| Empty Cecum | % MW | 0.55 | 0.53 | 0.52 | 0.58 |
| Full colon | % MW | 6.86 | 5.97 | 6.42 | 7.92 |
| Empty colon | % MW | 3.98 | 2.96 | 3.06 | 3.82 |

It is understood that the invention is not confined to the particular reagents or their concentrations, formulations, or sources described above, but embraces all equivalent forms thereof as come within the scope of the attached claims.

What is claimed is:

1. An animal feed composition comprising tributyrin and lactictol, wherein the tributyrin is present in an amount of from about 0.03% to about 3% by weight of the composition and the lactitol is present in an amount of from about 0.03% to about 3% by weight of the composition.

2. The animal feed composition of claim 1, further comprising a base feed ration suitable to meet the nutritional needs of animals selected from the group consisting of humans, swine, cattle, poultry, horses, sheep, goats, dogs, and cats.

3. The animal feed composition of claim 2, wherein the base feed ration includes silage, and the tributyrin and the lactitol are microencapsulated to protect the tributyrin and the lactitol from silage and intestinal microorganisms.

4. The animal feed composition of claim 1, further comprising a base feed ration suitable to meet the nutritional needs of animals selected from the group consisting of humans, swine, cattle, poultry, horses, sheep, goats, dogs, and cats.

5. The animal feed composition of claim 4, wherein the base feed ration includes silage, and the tributyrin and the lactitol are microencapsulated to protect the tributyrin and the lactitol from silage and rumen microorganisms.

6. The animal feed composition of claim 4, wherein the base feed ration is suitable to meet the nutritional needs of swine.

7. A method of feeding monogastric animals comprising feeding the monogastric animals a composition according to claim 1.

8. The method according to claim 7, wherein the composition is fed to swine.

9. A method of feeding monogastric animals comprising feeding the monogastric animals a composition according to claim 2.

10. A method of feeding monogastric animals comprising feeding the monogastric animals a composition according to claim 4.

11. A method of feeding ruminant animals comprising feeding the ruminant animals a composition according to claim 1.

12. A method of feeding ruminant animals comprising feeding the ruminant animals a composition according to claim 2.

13. A method of feeding ruminant animals comprising feeding the ruminant animals a composition according to claim 4.

* * * * *